(12) United States Patent
Ide (10) Patent No.: US 7,885,290 B2
(45) Date of Patent: Feb. 8, 2011

(54) COMMUNICATION TERMINAL APPARATUS AND SIGNAL RECEIVING METHOD

(75) Inventor: Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 139 days.

(21) Appl. No.: 12/382,297

(22) Filed: Mar. 12, 2009

(65) Prior Publication Data

US 2009/0175295 A1 Jul. 9, 2009

Related U.S. Application Data

(63) Continuation of application No. PCT/JP2006/318775, filed on Sep. 21, 2006.

(51) Int. Cl.
*H04J 3/16* (2006.01)
(52) U.S. Cl. .......... 370/465; 370/468; 370/488
(58) Field of Classification Search ........... 370/465, 370/468, 488, 235, 328, 230
See application file for complete search history.

(56) References Cited

U.S. PATENT DOCUMENTS

2008/0002977 A1    1/2008  Mori

FOREIGN PATENT DOCUMENTS

| JP | 57-53169 | 3/1982 |
|---|---|---|
| JP | 57-53170 | 3/1982 |
| JP | 1-276945 | 11/1989 |
| JP | 3-88535 | 4/1991 |
| JP | 3-160668 | 7/1991 |
| JP | 8-8954 | 1/1996 |
| JP | 9-36828 | 2/1997 |
| JP | 2000-49823 | 2/2000 |
| JP | 2000-124929 | 4/2000 |
| JP | 2000-165368 | 6/2000 |
| JP | 2000-188593 | 7/2000 |
| JP | 2005-33537 | 2/2005 |
| JP | 2008-11361 | 1/2008 |

OTHER PUBLICATIONS

International Search Report for International Application No. PCT/JP2006/318775, mailed Dec. 26, 2006.

*Primary Examiner*—Ricky Ngo
*Assistant Examiner*—Iqbal Zaidi
(74) *Attorney, Agent, or Firm*—Staas & Halsey LLP

(57) ABSTRACT

A communication terminal apparatus receives a management signal at a bit rate A and a data signal at a bit rate B (B>A) through the same line, and includes a band limiting unit, a signal regenerating unit, a timing controlling unit, and a data signal obtaining unit. The band limiting unit limits a band. The signal regenerating unit regenerates a signal having the bit rate A or the bit rate B. The timing controlling unit controls timing for obtaining a data signal based on a signal having the bit rate A. The timing controlling unit controls the band limiting unit to limit the band on receipt of the management signal and to lessen band limitation on receipt of the data signal. The data signal obtaining unit obtains the data signal from a signal having the bit rate B according to the timing control.

14 Claims, 8 Drawing Sheets

FIG.10

COMMUNICATION TERMINAL APPARATUS AND SIGNAL RECEIVING METHOD

CROSS-REFERENCE TO RELATED APPLICATION

This application is a continuation of PCT international application Ser. No. PCT/JP2006/318775 filed on Sep. 21, 2006 which designates the United States, the entire contents of which are incorporated herein by reference.

FIELD

The embodiment(s) discussed herein is (are) directed to a communication terminal apparatus connected to a network that contains a plurality of bit rates and a signal receiving method thereof.

BACKGROUND

To respond to an increase in data traffic typically found in the Internet, construction of high-speed and large-capacity optical access networks rapidly progresses. Recently, a gigabit-passive optical network (G-PON) in which a plurality of subscribers share an optical fiber cable while high-speed downstream transmission of 2.4 Gbps at the maximum is available is widely used as a high-speed optical access system for constructing an optical access network.

To achieve still higher speed transmission in the future, development of a bit-rate mixed PON system in which an optical access network that has already been constructed is utilized and at the same time high-speed transmission (for example, 10 Gbps) is available only to the subscribers who require high-speed transmission is expected from the economical point of view. For example, Japanese Laid-open Patent Publication No. 08-008954 discloses a technology that implements a bit-rate mixed PON system. According to the technology, a multi-rate burst circuit is provided to an optical network unit (ONU) for each subscriber. Thus, a plurality of bit rates can be mixed in the PON system.

If an existing optical access network is utilized so that the optical access network contains a plurality of bit rates, a subscriber that uses a high-speed bit rate encounters receiver sensitivity degradation. The faster a network is, i.e., the broader a band is, the lower a signal/noise (S/N) ratio becomes. Therefore, by speeding up part of an existing optical access network that has been designed such that the network has a relatively low receiver sensitivity without expecting higher speed data transmission, the S/N ratio drops due to the widening of the band, which degrades the receiver sensitivity.

For example, if part of an optical access network that has been designed to run at 2.4 Gbps is speeded up to 10 Gbps, receiver sensitivity of a communication terminal apparatus for a subscriber using the speed-up transmission drops, for example, by about 4 dB. As a result, expected high transmission speed may not be achieved.

SUMMARY

According to an aspect of the invention, a communication terminal apparatus receives a management signal transmitted at a first bit rate and a data signal transmitted at a second bit rate, which is higher than the first bit rate, through a common line. The communication terminal apparatus includes: a band limiting unit that reduces a noise component contained in a received waveform by limiting a band; a signal regenerating unit that regenerates a waveform transmitted through the line as a signal having the first bit rate or the second bit rate; a timing controlling unit that controls timing for obtaining a data signal destined for the communication terminal apparatus based on a signal having the first bit rate regenerated by the signal regenerating unit, the timing controlling unit controlling the band limiting unit to limit the band at timing of receipt of the management signal and controlling the band limiting unit to lessen band limitation at timing of receipt of the data signal; and a data signal obtaining unit that obtains the data signal from a signal having the second bit rate regenerated by the signal regenerating unit according to timing control of the timing controlling unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings. Although a communication terminal apparatus is described below as an optical network unit (ONU) in an optical access network, this is by way of example only. The following embodiments are also applicable to various other communication terminal apparatuses.

Figure 1:
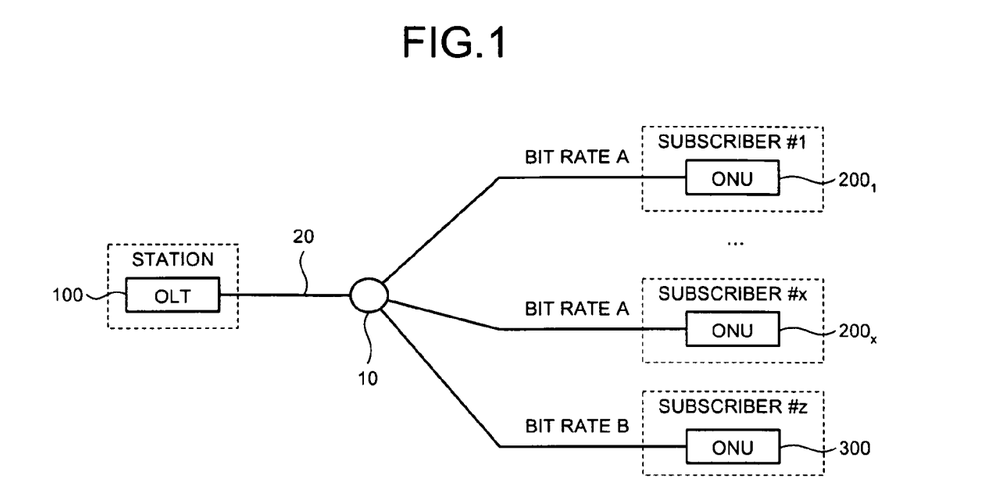
FIG. 1 is an example of an optical access network that contains a plurality of bit rates.

An optical access network that contains a plurality of bit rates is described in detail below. FIG. 1 is a diagram of an example of an optical access network that contains a plurality of bit rates. The optical access network illustrated in FIG. 1 is constructed in a PON system. In the optical access network, an optical fiber cable 20 connected to an optical line terminal (OLT) 100 provided in a station is split by a power splitter 10, and is shared by ONUs $200_1$ to $200_x$ and 300 on the side of subscribers.

The optical access network of the example contains the ONUs $200_1$ to $200_x$ that perform communication at a bit rate A and the ONU 300 that performs communication at a bit rate B, which is M times higher than the bit rate A. At first, the optical access network runs at the bit rate A, and later, an ONU for subscriber #z is replaced by the ONU 300 and an OLT at the station is replaced by the OLT 100. Thus, the optical access network can contain the both bit rates.

In the network, information exchange between the OLT 100, the ONUs $200_1$ to $200_x$ and 300 is controlled with a time division system. For example, a downstream communication from the station to the subscribers is controlled with a time division multiplexing (TDM) system, and the OLT 100 transmits data while switching a destination ONU every time slot.

Figure 2:
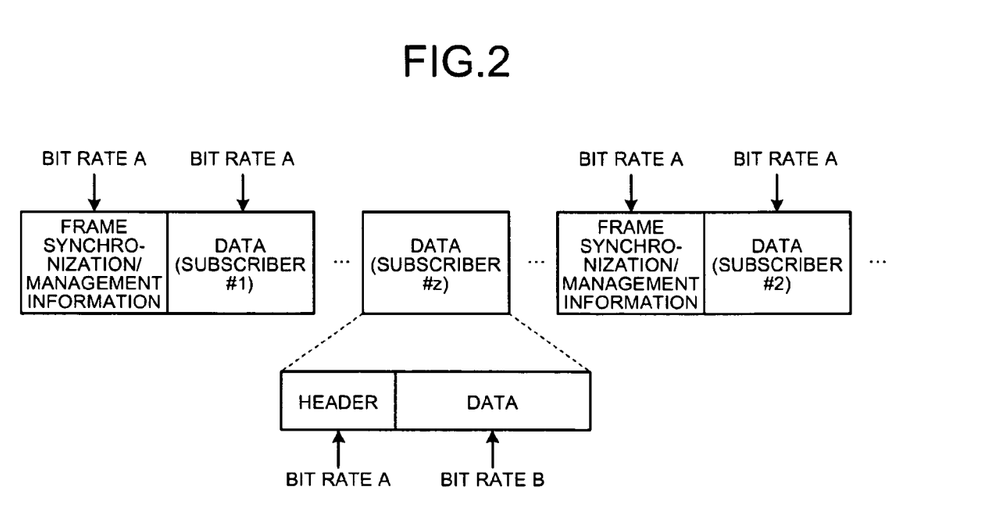
FIG. 2 is an example of a downstream signal transmitted in the optical access network illustrated in FIG. 1.

FIG. 2 is a diagram of an example of a downstream signal. As illustrated in FIG. 2, the downstream signal is time division multiplexed, and transmitted so that data destined for a plurality of subscribers is mixed therein. The OLT 100 periodically generates frame synchronization/management information so that the ONUs $200_1$ to $200_x$ and 300 perform frame synchronization to acquire timing to obtain data destined for each ONU, and the frame synchronization/management information is also multiplexed as is the data and is contained in the downstream signal.

In a downstream communication, the same signal is transmitted to ONUs for all subscribers. Each of the ONUs $200_1$ to $200_x$ and 300 discards data destined for ONUs other than itself and processes only the frame synchronization/management information and the data destined therefor. Thus, a one-to-one connection is virtually established between the OLT 100 and the ONUs $200_1$ to $200_x$ and 300.

Focusing attention on bit rates, all the ONUs are required to read the frame synchronization/management information. Thus, the frame synchronization/management information is transmitted at the bit rate A. Time divided data is transmitted with a header, attached thereto, containing information of specifying a destination ONU. All the ONUs are required to read the header. Thus, the header is also transmitted at the bit rate A. Data itself is transmitted at a bit rate corresponding to the destination ONU.

Thus, the ONUs $200_1$ to $200_x$ receive all the signals at the bit rate A. On the other hand, the ONU 300 receives a management signal that transmits a header and frame synchronization/management information at the bit rate A and a data signal that transmits data itself at the bit rate B.

In an environment in which different bit rates are mixed, the data signal is transmitted at a bit rate corresponding to a destination ONU, and the management signal is always transmitted at the lower bit rate A. As described above, an ONU designed to communicate at a higher bit rate is affected by noise in a network designed to run at a lower bit rate; thereby deteriorating receiver sensitivity. Especially, the degradation of receiver sensitivity can lead to a problem at the time of receiving a management signal.

Only a destination ONU needs to read the data signal. Therefore, it is not necessary to consider effects to other existing ONUs. For example, by employing error correcting techniques such as forward error correction (FEC), degradation of receiver sensitivity can be compensated. On the other hand, all the ONUs are required to read a management signal. Therefore, a compensating approach that may affect the existing ONUs can not be adapted.

To prevent degradation of receiver sensitivity in a mixed bit rates network, at the time of receiving the management signal, the ONU 300 of the first embodiment dynamically modifies a band of a signal that is input thereto as will be described below. More specifically, at the timing of receiving the management signal, a band of a signal that is input thereto is limited corresponding to the bit rate A, thereby reducing noise, and at the timing of receiving the data signal, a band of a signal that is input thereto is limited corresponding to the bit rate B, thereby facilitating high-speed signal input.

Figure 3:
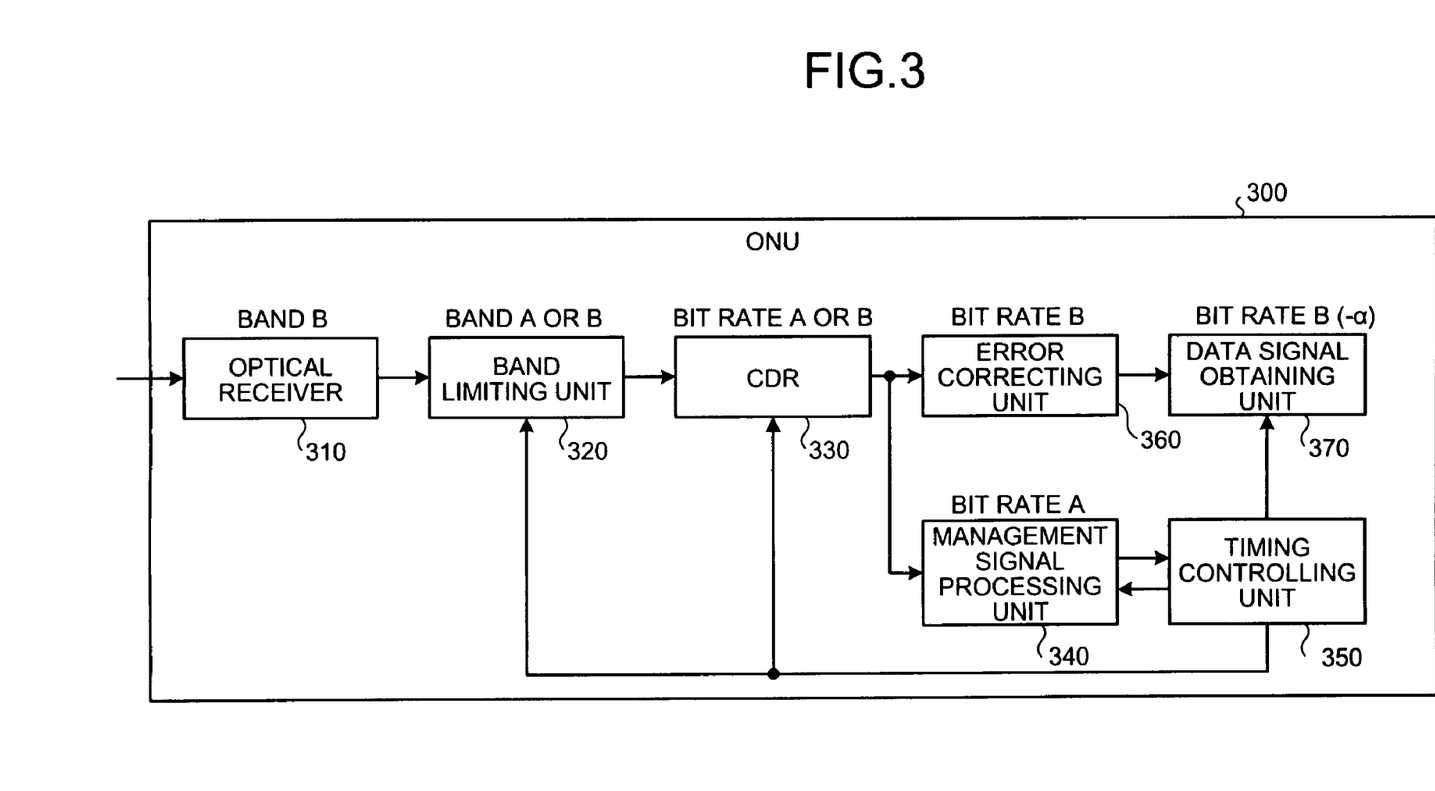
FIG. 3 is an example block diagram of an ONU according to an embodiment.

The configuration of the ONU 300 is described in detail below. FIG. 3 is a block diagram of the ONU 300. For simplicity, FIG. 3 illustrates only the configuration related to this embodiment. For example, the configuration related to signal transmission is omitted.

As illustrated in FIG. 3, the ONU 300 includes the optical receiver 310, the band limiting unit 320, a signal regenerating unit (hereinafter, "clock data recovery (CDR)") 330, a management signal processing unit 340, a timing controlling unit 350, an error correcting unit 360, and a data signal obtaining unit 370.

The optical receiver 310 converts an optical signal received, for example, by a photodiode into an electrical signal waveform. The band limiting unit 320 is a filter circuit that limits a band of the signal that is input thereto in accordance with control by the timing controlling unit 350 so that the band corresponds to the bit rate A or B.

The CDR 330 generates a clock signal to run the ONU 300 according to the waveform converted by the optical receiver 310 and passed through the band limiting unit 320, and regenerates a digital signal from the signal waveform. The ONU 300 regenerates the signal waveform as a digital signal having the bit rate A or B in accordance with control by the timing controlling unit 350.

A digital signal regenerated by the CDR 330 is received by the management signal processing unit 340 and the error correcting unit 360. The management signal processing unit 340 recognizes frame synchronization/management information and a header by reading the management signal having the bit rate A that is regenerated by the CDR 330, thereby performing various control processes. For example, the management signal processing unit 340 performs frame synchronization and obtains timing for altering time slots by recognizing frame synchronization signal consisting of known signal patterns.

The management signal processing unit 340 determines at which time slot data is transmitted to the particular destination ONU in accordance with information contained in the frame synchronization/management information and the header, and notifies the timing controlling unit 350 of the result of the determination.

The timing controlling unit 350 distinguishes between timing at which the management signal is received and timing at which the data signal is received, thereby controlling operation of the ONU 300 according to the type of a received signal.

More specifically, instantly after the communication terminal apparatus is started, the timing controlling unit 350 controls the band limiting unit 320 to limit a band corresponding to the bit rate A, and controls the CDR 330 to regenerate a signal at the bit rate A. As a result, a less noisy signal having the bit rate A is provided to the management signal processing unit 340, and the management signal processing unit 340 can easily perform frame synchronization and recognize synchronization/management information and a header.

Then, the timing controlling unit 350 controls the band limiting unit 320, the CDR 330, and the data signal obtaining unit 370 according to timing notified by the management signal processing unit 340.

More specifically, at the timing at which data transmission to the particular ONU is started, the timing controlling unit 350 makes the band limiting unit 320 limit the band corresponding to the bit rate B, controls the CDR 330 to regenerate a signal at the bit rate B, and controls the data signal obtaining unit 370 to obtain the data signal. At the timing at which data transmission to the particular ONU is completed, the timing controlling unit 350 controls the band limiting unit 320 to limit the band corresponding to the bit rate A, controls the CDR 330 to regenerate a signal at the bit rate A, and controls the data signal obtaining unit 370 to terminate obtaining of the data signal.

Due to the control, during a period that a management signal is received, noise is reduced because of the band limitation, thereby enhancing receiver sensitivity of the management signal. During a period that a data signal is received, a data signal having a higher bit rate is received by the data signal obtaining unit 370 without being blocked by the band limitation.

The error correcting unit 360 corrects errors in a data signal transmitted to the particular ONU, thereby enhancing receiver sensitivity of a data portion. Error correction of the data signal can be performed, for example, by employing FEC. In error correction performed by error correcting techniques such as FEC, data is made redundant at a transmission source. Thus, a bit rate of the data signal after the error correction by the error correcting unit 360 slightly drops by the amount of data made redundant.

The error correcting unit 360 corrects signals that constitute management signals and data destined for other ONUs. However, these signals are discarded by the data signal obtaining unit 370, and cause no problem.

The data signal obtaining unit 370 abstracts data destined for the particular ONU by obtaining a data signal corrected by the error correcting unit 360 with timing specified by the timing controlling unit 350. The data signal obtaining unit 370 provides the obtained data to an appropriate processing unit (not illustrated) and the processing unit performs required data processing.

As described above, according to the first embodiment, the ONU 300 dynamically modifies a band of a signal that is input thereto so that receiver sensitivity of a lower speed management signal is enhanced and at the same time a higher speed data signal is received without any block because of band limitation.

Figure 4:
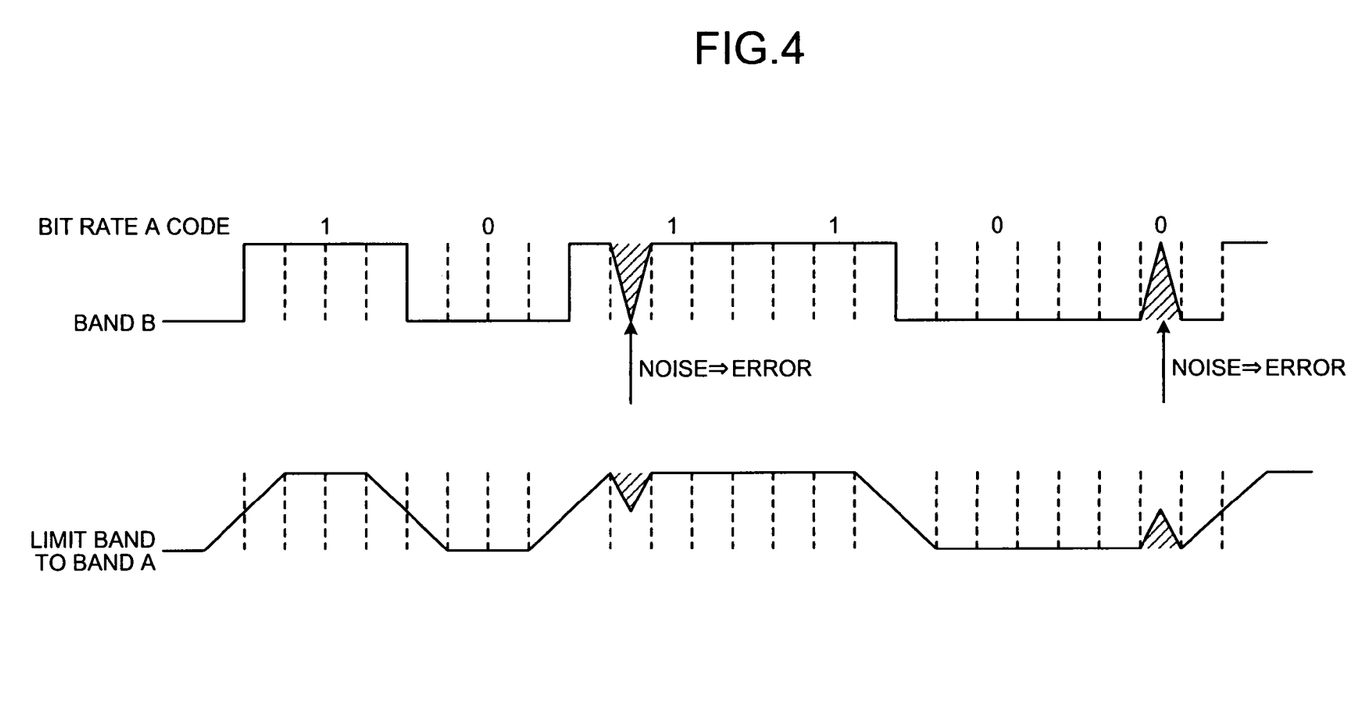
FIG. 4 is an example schematic diagram for explaining effect of band limitation.

Effect due to the band limitation is described in detail below with reference to FIG. 4. FIG. 4 is a diagram of an example of a management signal transmitted in a network that contains a lower speed signal having the bit rate A and a higher speed signal having the bit rate B, wherein B=A×4. As illustrated in FIG. 4, without band limitation, the management signal contains significant noise from the point of an ONU corresponding to the bit rate B. The noise can lead to degradation of receiver sensitivity.

With the band limited corresponding to the bit rate A, noise is significantly reduced, thereby improving receiver sensitivity. More specifically, if the bit rate A is 2.5 Gbps and the bit rate B is 10 Gbps, receiver sensitivity is improved, for example, by more than 3 dB by limiting the band from 10 GHz to 2.5 GHz.

Figure 5:
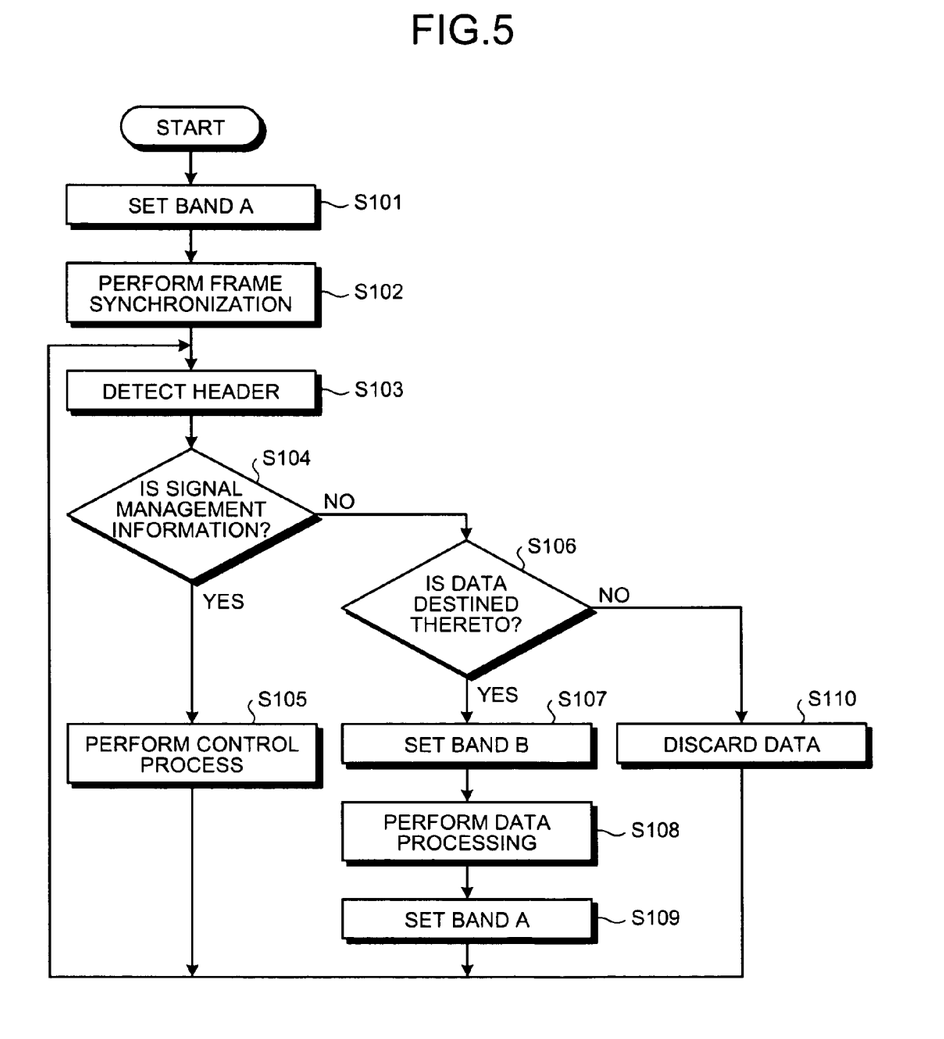
FIG. 5 is an example flowchart of the operation of the ONU according to the embodiment.

The operation of the ONU 300 illustrated in FIG. 3 is described in detail below. FIG. 5 is a flowchart of the operation of the ONU 300. As illustrated in FIG. 5, after the ONU 300 is turned on, the timing controlling unit 350 controls the band limiting unit 320 to limit the band corresponding to the bit rate A, and controls the CDR 330 to regenerate a signal at the bit rate A (Step S101).

Then, the management signal processing unit 340 performs frame synchronization, and frame synchronization/management information and a header can be recognized normally (Step S102). Thus, the initial process is completed, and the management signal processing unit 340 performs the following process every time a signal corresponding to one time slot is received.

The management signal processing unit 340 detects a header of the signal corresponding to one time slot thus obtained (Step S103). If the signal corresponding to one time slot thus obtained is determined to be the frame synchronization/management information (Yes at Step S104), the management signal processing unit 340 performs a control process according to the content of the frame synchronization/management information (Step S105).

If the data corresponding to one time slot thus obtained is not the frame synchronization/management information and is determined to be data destined for the ONU 300 (No at Step S104 and Yes at Step S106), the management signal processing unit 340 notifies the timing controlling unit 350 of information for obtaining the data.

The timing controlling unit 350 thus notified by the management signal processing unit 340 controls the band limiting unit 320 to limit the band corresponding to the bit rate B, and the CDR 330 to regenerate a signal at the bit rate B (Step S107). The timing controlling unit 350 controls the data signal obtaining unit 370 to obtain the data (Step S108). If data transmission is completed, the band limiting unit 320 limits the band corresponding to the bit rate A and the CDR 330 regenerates a signal at the bit rate A (Step S109).

The signal corresponding to one time slot thus obtained is determined to be neither the frame synchronization/management information or data destined for the ONU 300 (No at Step S104 and No at Step S106), the management signal processing unit 340 discards the data (Step S110).

As described above, according to the first embodiment, a communication terminal apparatus that receives a low-speed signal and a high-speed signal on the same line is configured so that the band is limited at the time of receiving a low-speed signal. Therefore, it is possible to prevent degradation of receiver sensitivity at the time of receiving a low-speed signal.

In the first embodiment, a filter circuit is employed to perform band limitation. Band limitation may also be performed by modifying a feedback resistor of a preamplifier (preamp) in an optical receiver.

Figure 6:
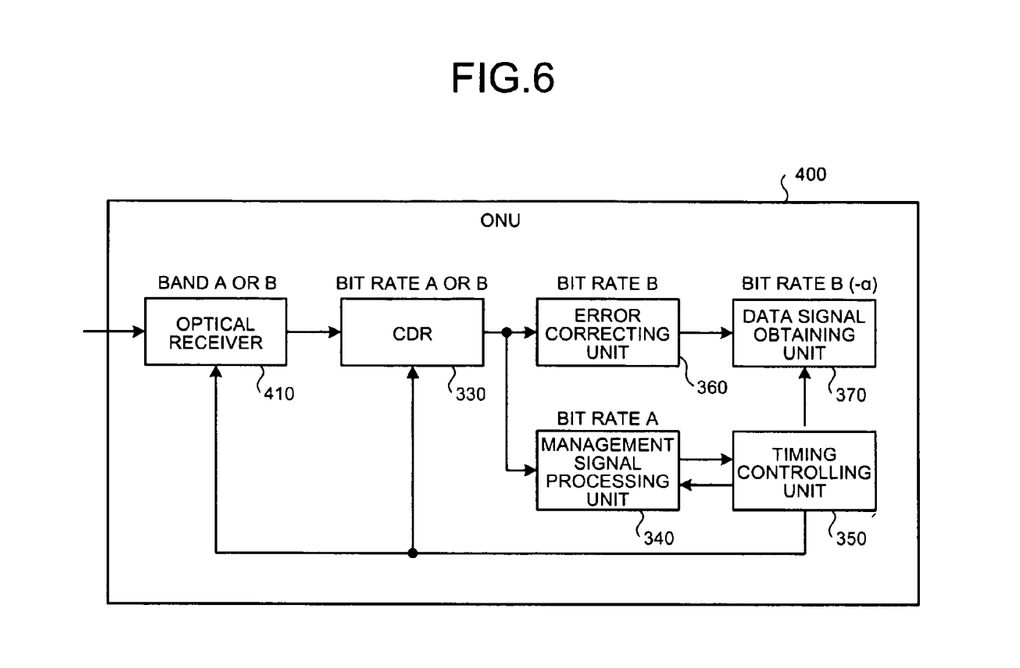
FIG. 6 is an example block diagram of the ONU according to another embodiment.

FIG. 6 is a block diagram of an ONU 400 according to a second embodiment. As illustrated in FIG. 6, the ONU 400 includes an optical receiver 410, a CDR 330, the management signal processing unit 340, the timing controlling unit 350, the error correcting unit 360, and the data signal obtaining unit 370.

The CDR 330, a management signal processing unit 349, the timing controlling unit 350, the error correcting unit 360, and the data signal obtaining unit 370 operate basically in the same manner as those of FIG. 3, except that the timing controlling unit 350 controls the optical receiver 410 for band limitation instead of the band limiting unit 320.

Figure 7:
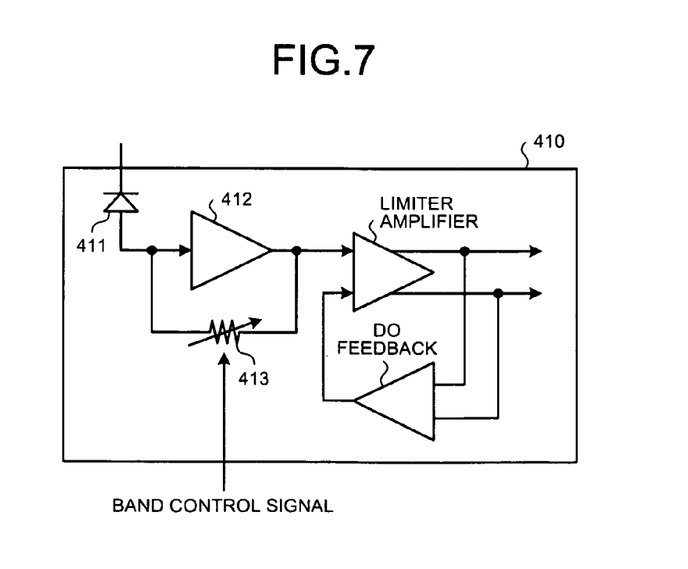
FIG. 7 is an example block diagram of an optical receiver illustrated in FIG. 6.

FIG. 7 is a block diagram of the optical receiver 410. As illustrated in FIG. 7, the optical receiver 410 includes a photodiode 411 that converts an optical signal to an electric signal, a preamplifier circuit (preamp) 412 that amplifies an electric signal obtained by the optical receiver 410, and a feedback resistor 413 that adjust a gain of the preamp 412.

With this configuration, the timing controlling unit 350 can control a band of a signal that is input thereto, by adjusting a resistance value of the feedback resistor 413. In the method, noise density is reduced at the time of band limitation, thereby improving receiver sensitivity, for example, by about 6 dB.

As described above, according to the second embodiment, by modifying a resistance value of the feedback resistor in the preamplifier circuit, the band is limited. Therefore, while the band is limited, noise density is reduced and receiver sensitivity is further improved significantly.

The first and second embodiments describe examples in which band limitation is dynamically modified according to a bit rate of a signal that is input thereto. For receiving a high-speed signal, fluctuation of band limitation is preferably smaller. Therefore, an example is described below in which band limitation is performed only at the time of frame synchronization.

Figure 8:
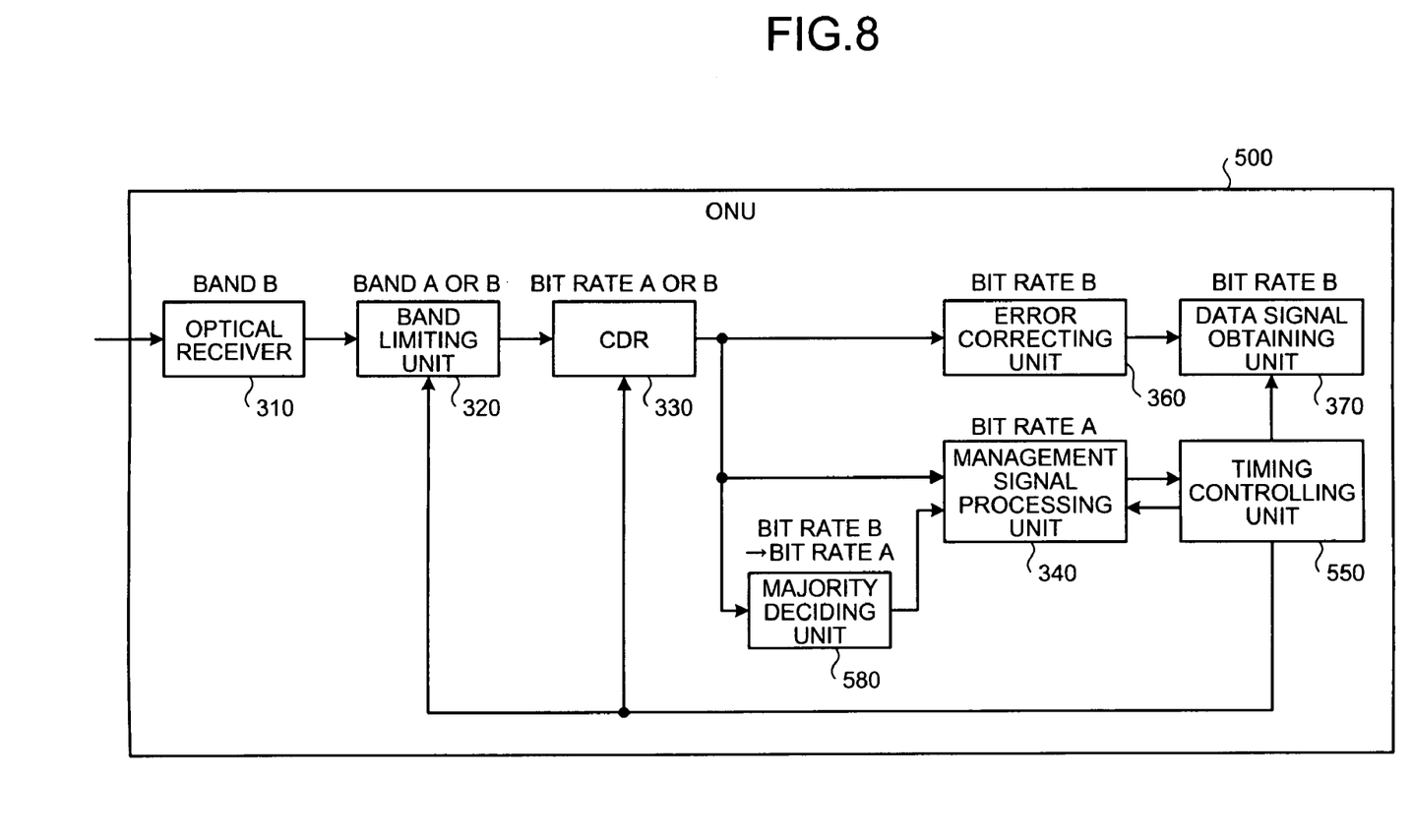
FIG. 8 is an example block diagram of the ONU according to still another embodiment.

FIG. 8 is a block diagram of an ONU 500 according to a third embodiment. As illustrated in FIG. 8, the ONU 500 includes the optical receiver 310, a band limiting unit 320, the CDR 330, the management signal processing unit 340, a timing controlling unit 550, the error correcting unit 360, the data signal obtaining unit 370, and a majority deciding unit 580.

The optical receiver 310, the band limiting unit 320, the CDR 330, the management signal processing unit 340, the error correcting unit 360, and the data signal obtaining unit 370 are basically the same as those of FIG. 3. Therefore, their description is not repeated.

The timing controlling unit 550 distinguishes between timing at which the management signal is received and timing at which the data signal is received, thereby controlling operation of the ONU 500 according to the type of a received signal.

More specifically, instantly after a communication terminal apparatus is started, the timing controlling unit 550 controls the band limiting unit 320 to limit the band corresponding to the bit rate A, and controls the CDR 330 to regenerate a signal at the bit rate A. Thus, a less noisy signal having the bit rate A is provided to the management signal processing unit 340. As a result, the management signal processing unit 340 can perform frame synchronization easily and recognize frame synchronization/management information and a header.

Then, the timing controlling unit 550 controls the band limiting unit 320 to limit the band constantly corresponding to the bit rate B, and controls the CDR 330 to regenerate a signal constantly at the bit rate B. The timing controlling unit 550 instructs the data signal obtaining unit 370 to start or terminate obtaining data destined for the particular ONU according to information notified by the management signal processing unit 340.

Figure 9:
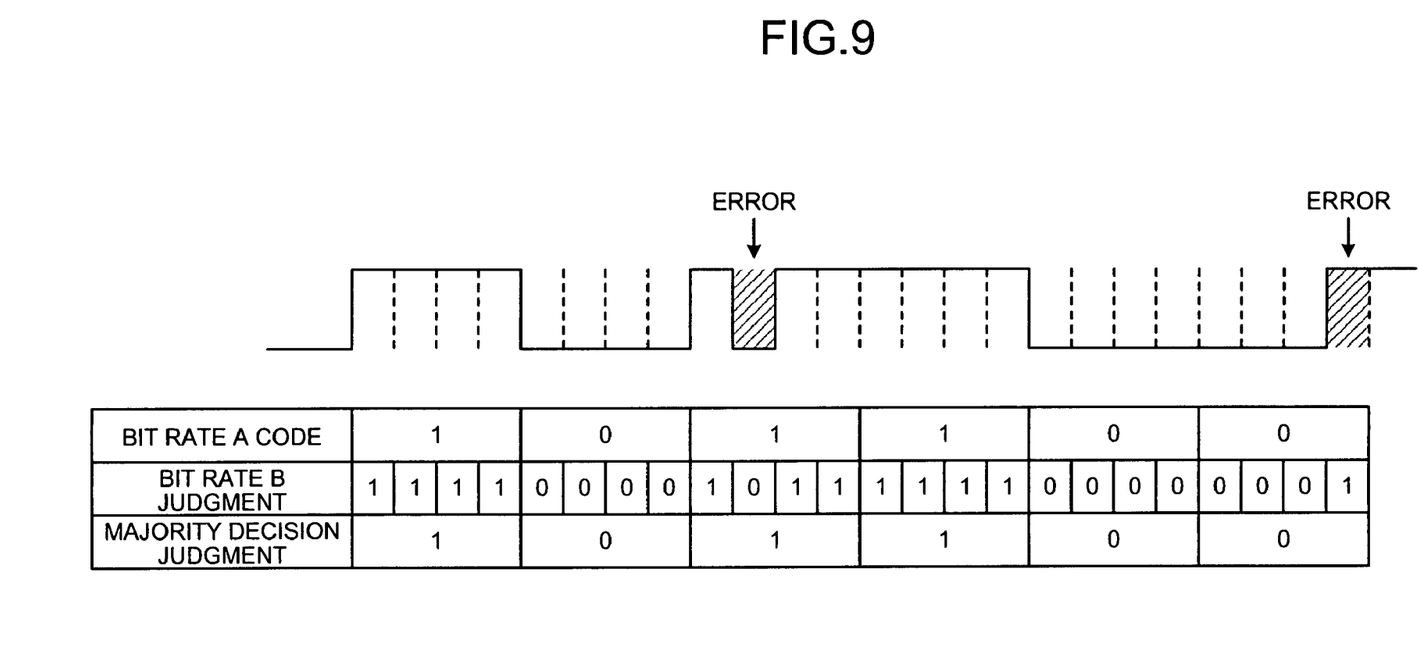
FIG. 9 is an example schematic diagram for explaining the operation of a majority deciding unit illustrated in FIG. 8.

The majority deciding unit 580 converts, every M bits, a signal having the bit rate B regenerated by the CDR 330 into one bit of a management signal while correcting an error by using majority decision logic. The majority deciding unit 580 then outputs the management signal to the management signal processing unit 340. FIG. 9 illustrates an example of the operation of the majority deciding unit 580. In the example, the bit rate B is four times as large as the bit rate A, and a signal of four bits is converted into a management signal of one bit.

A digital signal regenerated by the CDR 330 is supposed to be represented by 4 bits having the same value, like "0000" or "1111", and be able to be simply converted to "0" or "1". However, an error may occur in some bits, like "1011" or "0001", due to influence from noise caused by speeding up.

The majority deciding unit 580 converts "1011", into "1" and "0001" into "0" by using majority decision logic. Thus, by using majority decision logic, an error rate of a management signal can be significantly reduced, comparing with determining a value of the management signal according specifically to a bit in a specific location.

For example, if majority decision is performed according to four values as in the example of FIG. 9, one bit of error correction is possible. In a received signal having an error rate of E (for example, $1 \times 10^{-6}$), a probability of errors occurring repeatedly is $E^2$ (for example $1 \times 10^{-12}$). Therefore, receiver sensitivity property can be improved, for example, by 4 to 5 dB.

If simple majority decision logic is employed, majority decision becomes logically indefinite when there are two identical majority values in a signal (for example, a value of two and a value of two in four bits). Even in such cases, by assigning a weight on a bit with less intersymbol interference, that is, a bit that has less probability of errors (for example, the third bit in the four bits) and performing majority decision judgment, the number of errors can be further reduced.

In the configuration above, band limitation is performed only at the time of frame synchronization, and after the frame synchronization, receiver sensitivity of management signal is improved by majority decision judgment. Therefore, operation speed of band limitation does not cause a bottleneck for high-speed operation, which facilitates the communication terminal apparatus of the third embodiment to support high-speed signal receiving.

Figure 10:
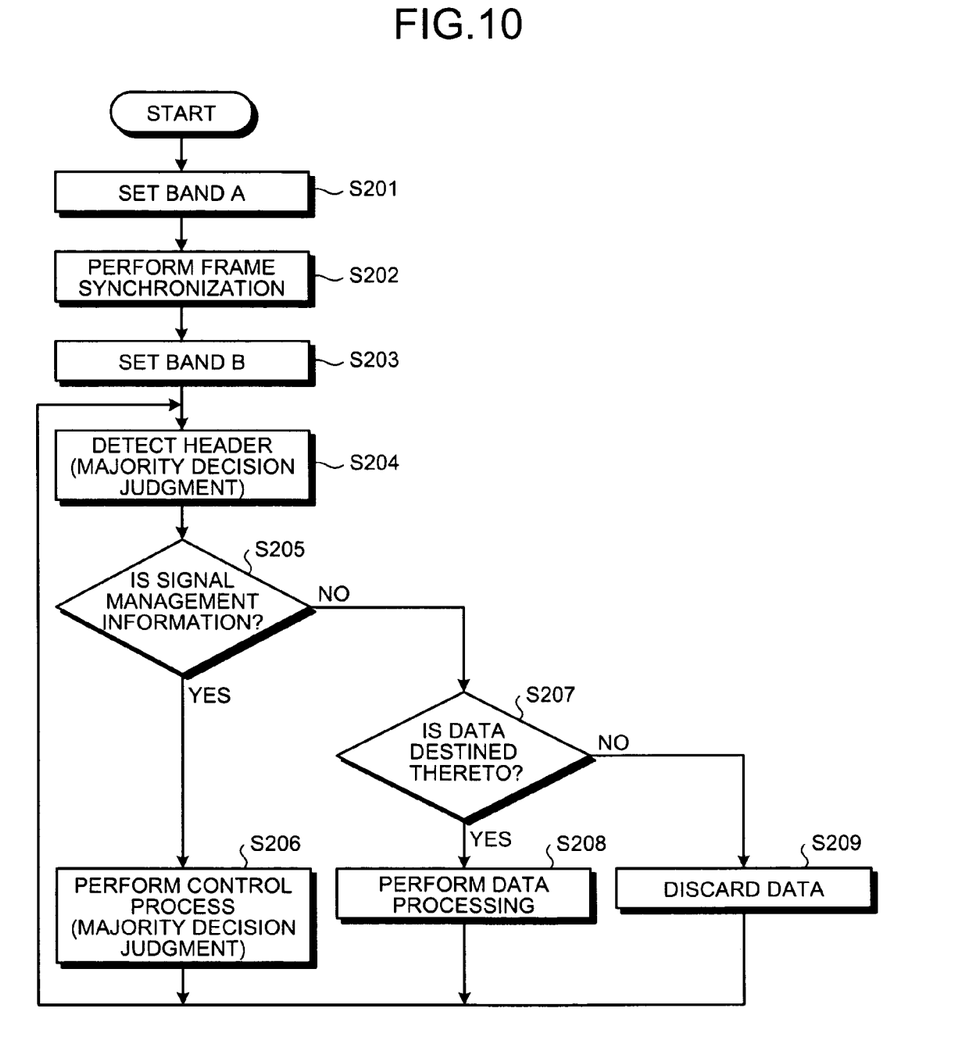
FIG. 10 is an example flowchart of the operation of the ONU illustrated in FIG. 8.

The operation of the ONU 500 in FIG. 8 is described in detail below. FIG. 10 is a flowchart of the operation of the ONU 500. As illustrated in FIG. 10, after the ONU 500 is turned on, the timing controlling unit 550 controls the band limiting unit 320 to limit the band corresponding to the bit rate A, and controls the CDR 330 to regenerate a signal having the bit rate A (Step S201).

Then, the management signal processing unit 340 performs frame synchronization, and thus frame synchronization/management information and a header can be recognized normally (Step S202). When the frame synchronization is completed, the timing controlling unit 550 controls the band limiting unit 320 to limit the band corresponding to the bit rate B, and controls the CDR 330 to regenerate a signal at the bit rate B (Step S203). Thus, the initial process is completed, and the management signal processing unit 340 performs the following process every time a signal corresponding to one time slot is received.

The management signal processing unit 340 detects a header of the signal corresponding to one time slot thus obtained by reading the management signal converted by the majority deciding unit 580 with majority decision judgment (Step S204). If the signal corresponding to one time slot thus obtained is determined to be frame synchronization/management information (Yes at Step S205), the management signal processing unit 340 performs a control process according to the content of the frame synchronization/management information (Step S206).

If the data corresponding to one time slot thus obtained is not the frame synchronization/management information and is determined to be data destined for the ONU 500 (No at Step S205 and Yes at Step S207), the management signal processing unit 340 notifies the timing controlling unit 350 of information for obtaining the data and the data signal obtaining unit 370 obtains the data (Step S208).

The signal corresponding to one time slot thus obtained is determined to be neither frame synchronization/management information or data destined for the ONU 500 (No at Step S205 and No at Step S207), the management signal processing unit 340 discards the data (Step S209).

As described above, according to the third embodiment, at the time of frame synchronization, receiver sensitivity is improved by band limitation, and after the frame synchronization, receiver sensitivity is improved with majority decision judgment. Therefore, it is possible to improve receiver sensitivity of a low-speed signal as well as to achieve high-speed operation.

As set forth hereinabove, according to an embodiment, precision of evaluation according to majority decision can be enhanced by taking error proneness for each bit into account.

Moreover, band limitation can be performed with a simple configuration.

Furthermore, noise density can be reduced, resulting in improved receiver sensitivity.

Still further, error that occurs not only in a low-speed signal and but also in a high-speed signal can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication terminal apparatus for an optical network unit, that receives a management signal transmitted at a first bit rate and a data signal transmitted at a second bit rate, which is higher than the first bit rate, through a common line, the communication terminal apparatus comprising a band limiting unit that reduces a noise component contained in a received waveform by limiting a band; a signal regenerating unit that regenerates a waveform transmitted through the line as a signal having the first bit rate or the second bit rate; a timing controlling unit that controls timing for obtaining a data signal destined for the communication terminal apparatus based on a signal having the first bit rate regenerated by the signal regenerating unit, the timing controlling unit controlling the band limiting unit to limit the band at timing of receipt of the management signal and controlling the band limiting unit to lessen band limitation at timing of receipt of the data signal; and a data signal obtaining unit that obtains the data signal from a signal having the second bit rate regenerated by the signal regenerating unit according to timing control of the timing controlling unit, wherein the band limiting unit limits the band by modifying a resistance value of a feedback resistor in a preamplifier circuit that amplifies an input signal.

2. The communication terminal apparatus according to claim 1, wherein the band limiting unit limits the band with a filter circuit.

3. The communication terminal apparatus according to claim 1, further comprising an error correcting unit that performs error correction on the data signal with an error correction code.

4. A communication terminal apparatus for an optical network unit, that receives a management signal transmitted at a first bit rate and a data signal transmitted at a second bit rate, which is M times higher than the first bit rate, through a common line, the communication terminal apparatus comprising a band limiting unit that reduces a noise component contained in a received waveform of the management signal by limiting a band at a time of frame synchronization; a signal regenerating unit that regenerates a waveform transmitted through the line as a signal; a majority deciding unit that converts M bits of a signal having the second bit rate regenerated by the signal regenerating unit into the management signal of one bit by majority decision; a timing controlling unit that controls timing for obtaining a data signal destined for the communication terminal apparatus based on the management signal obtained by the majority deciding unit; and a data signal obtaining unit that obtains the data signal from the signal regenerated by the signal regenerating unit according to timing control of the timing controlling unit, wherein the band limiting unit limits the band by modifying a resistance value of a feedback resistor in a preamplifier circuit that amplifies an input signal.

5. The communication terminal apparatus according to claim 4, wherein the majority deciding unit converts M bits of the signal regenerated by the signal regenerating unit into the management signal of one bit by weighting each bit in the majority decision.

6. The communication terminal apparatus according to claim 4, wherein the band limiting unit limits the band with a filter circuit.

7. The communication terminal apparatus according to claim 4, further comprising an error correcting unit that performs error correction on the data signal with an error correction code.

8. A signal receiving method applied to a communication terminal apparatus for an optical network unit, that receives a management signal transmitted at a first bit rate and a data signal transmitted at a second bit rate, which is higher than the first bit rate, through a common line, the signal receiving method comprising limiting a band to reduce a noise component contained in a received waveform; regenerating a waveform transmitted through the line as a signal having the first bit rate or the second bit rate; controlling timing for obtaining a data signal destined for the communication terminal apparatus based on a signal having the first bit rate regenerated at the regenerating, the controlling including limiting the band at timing of receipt of the management signal and lessening band limitation at timing of receipt of the data signal; and obtaining the data signal from a signal having the second bit rate regenerated at the regenerating according to timing control at the controlling, wherein the limiting includes limiting the band by modifying a resistance value of a feedback resistor in a preamplifier circuit that amplifies an input signal.

9. The signal receiving method according to claim 8, wherein the limiting includes limiting the band with a filter circuit.

10. The signal receiving method according to claim 8, further comprising performing error correction on the data signal with an error correction code.

11. A signal receiving method applied to a communication terminal apparatus for an optical network unit, that receives a management signal transmitted at a first bit rate and a data signal transmitted at a second bit rate, which is M times higher than the first bit rate, through a common line, the signal receiving method comprising limiting a band at a time of frame synchronization to reduce a noise component contained in a received waveform of the management signal; regenerating a waveform transmitted through the line as a signal; converting M bits of a signal having the second bit rate regenerated at the regenerating into the management signal of one bit by majority decision; controlling timing for obtaining a data signal destined for the communication terminal apparatus based on the management signal obtained at the converting; and obtaining the data signal from the signal regenerated at the regenerating according to timing control at the controlling, wherein the limiting includes limiting the band by modifying a resistance value of a feedback resistor in a preamplifier circuit that amplifies an input signal.

12. The signal receiving method according to claim 11, wherein the converting includes converting M bits of the signal regenerated at the regenerating into the management signal of one bit by weighting each bit in the majority decision.

13. The signal receiving method according to claim 11, wherein the limiting includes limiting the band with a filter circuit.

14. The signal receiving method according to claim 11, further comprising performing error correction on the data signal with an error correction code.

* * * * *